Patented Oct. 4, 1938

2,132,178

UNITED STATES PATENT OFFICE

2,132,178

MANUFACTURE OF 4-AMINOBENZENE-SULPHONIC ACID AMIDE

Fritz Mietzsch and Josef Klarer, Wuppertal-Elberfeld, Germany, assignors to Winthrop Chemical Company, Inc., New York, N. Y., a corporation of New York No Drawing. Application April 3, 1937, Serial No. 134,736. In Germany April 7, 1936

5 Claims. (Cl. 260—556)

This invention relates to a process for the manufacture of 4-aminobenzene-sulphonic acid amide in a pure state on a commercial scale.

Various circumstances have rendered the use of 4-aminobenzene-sulphonic acid amide for combating streptococci infections difficult. The hydrochloride which according to known processes is obtained by saponification of the 4-acetyl-amino-benzene-sulphonic acid amide with hydrochloric acid dissolves in water with Congo acid reaction and accordingly has a disagreeable taste. The base which is obtained therefrom by neutralization with alkali metal carbonate- or ammonia solution is tasteless. However, the base obtained in this manner contains toxic contaminations and is not sufficiently stable. Even on recrystallization from alcohol a pure, therapeutically valuable product is obtained only under certain conditions, the purification, however, causes considerable loss of substance. According to Gelmo "Journal für praktische Chemie" 77, 372, (1908) the base is partially decomposed in the cold by means of very weak alkalies and readily decomposes when warm while splitting off ammonia and forming sulphanilic acid alkali, so that the simplest purification with the aid of alkali seemed to be impossible. Rather, it appeared to be necessary to free the base which had been set free by neutralization with alkali from the adhering alkali by circumstantial washing so that on subsequent recrystallization from alcohol in the heat no decomposition could take place. When working on a commercial scale, however, a purification from an alkaline medium would be particularly advantageous for removing the inactive sulphanilic acid which is readily formed in the technical saponification of the acetyl compound. The purification from the alkaline medium has the further advantage that also small quantities of iron, which are always present when working in an iron vessel, can be separated.

In accordance with the present invention it is possible to obtain the 4-aminobenzene-sulphonic acid amide from alkaline reacting agents in a pure state and in a particularly favorable manner by recrystallizing the base or its salts from aqueous solutions of such alkaline reacting substances the basicity of which is not sufficient for salt formation with the 4-aminobenzene-sulphonic acid amide. Alkaline reacting media of the kind specified are, for instance, ammonia and amines, such as methyl-, dimethyl-, and trimethylamine, ethyl- and diethylamine, hydroxyethyl- and di-hydroxyethyl-amine, butylamine, ethylenediamine, piperidine and piperazine, furthermore salts of the alkali and alkaline-earth metals with weak acids, for instance, sodium, potassium and calcium carbonate, sodium borate, secondary sodium phosphate, sodium or potassium acetate or propionate and the like. The process can also be carried out in such a manner that the 4-aminobenzene-sulphonic acid amide or its salts are primarily dissolved in alkalies or alkaline-earth metal hydroxides which form soluble salts with the 4-aminobenzene-sulphonic acid amide, filtering the solution; if necessary, and decreasing the alkalinity to such an extent that the 4-aminobenzene-sulphonic acid amide separates. For dissolving the base or its salts, for instance, sodium-, potassium- or calcium-hydroxide solution may be used. The alkalinity of the solution can be decreased to the above-specified degree, for instance, by the addition of ammonium salts, for instance, ammonium chloride, -nitrate or -sulphate, sodium acetate, acetic acid and the like. According to the two modes of execution a 4-aminobenzene-sulphonic acid amide melting at 164–165° C. is readily obtained. It is a snow-white, stable product which is free from acid impurities, for instance, sulphanilic acid and traces of iron; it is likewise free from toxic impurities and well suitable for therapeutic application. This purification is effected without any perceptible decrease of the yield of base present in the crude product but in a more simple manner than the purification from neutral media. Besides, no organic solvents are required.

The invention is further illustrated by the following examples without being restricted thereto:

*Example 1.*—1 kg. of the crude hydrochloride of 4-aminobenzene-sulphonic acid amide which has been obtained by saponification of the acetyl compound with 15% hydrochloric acid is dissolved in 4 liters of water at 20° C. The free base is precipitated by the addition of 0.8 kg. of sodium carbonate ($+10H_2O$). The base which has been filtered off with suction is dissolved in 2.5 liters of boiling water without removing the adhering excess sodium carbonate, treated with animal charcoal and filtered with suction while hot. On cooling to 20° C. the base separates in a crystalline form.

*Example 2.*—2.2 kgs. of the crude sulphate of 4-aminobenzene-sulphonic acid amide (obtained by saponification of the acetyl compound with 20% sulphuric acid) are dissolved in 12 liters of water at 20° C. By the addition of 1.5 kgs. of sodium carbonate (+10H₂O) the base is set free. The aqueous mixture containing the base is then heated to 100° C. whereby the base dissolves, animal charcoal is added and the solution filtered while hot. On cooling to 20° C. the free base crystallizes out.

*Example 3.*—1 kg. of the crude hydrochloride of 4-aminobenzene-sulphonic acid amide (obtained by saponification of the acetyl compound) is introduced into 6 liters of 3% sodium hydroxide solution at 20° C. Animal charcoal is added and the solution stirred for 10 minutes and filtered with suction. The filtrate is treated with a concentrated aqueous solution of 0.7 kg. of ammonium chloride while stirring. The pure base obtained is filtered off with suction, washed with water and dried.

Instead of dissolving the 4-aminobenzene-sulphonic acid amide in caustic soda solution after saponification, the acetylaminobenzene-sulphonic acid amide can be dissolved in excess caustic soda solution from the beginning; the acetyl group is then split off upon boiling for half an hour in the alkaline reacting solution and the 4-aminobenzene-sulphonic acid amide obtained is separated from the alkaline reacting solution by rendering the solution ammoniacal by the addition of ammonium chloride.

We claim:—

1. The process in which crude para-aminobenzene-sulphonamide is purified by reprecipitation from aqueous solutions which contain an alkaline reacting substance the basicity of which is not sufficient for salt formation with the para-aminobenzene sulphonamide.

2. The process in which crude para-aminobenzenesulphonamide is purified by reprecipitation from aqueous solutions containing alkali metal carbonate.

3. The process in which crude para-aminobenzenesulphonamide is purified by reprecipitation from aqueous solutions containing ammonia.

4. The process in which crude para-aminobenzenesulphonamide is purified by reprecipitation from aqueous solutions containing caustic alkali by rendering the solution ammoniacal by the addition of a salt of ammonia.

5. Process as claimed in claim 4, in which the aqueous alkaline solution of the crude para-aminobenzene sulphonamide is obtained by saponification of a para-acylaminobenzene sulphonamide with caustic alkali.

FRITZ MIETZSCH.
JOSEF KLARER.